United States Patent
Ooishi

(10) Patent No.: US 8,280,170 B2
(45) Date of Patent: Oct. 2, 2012

(54) INTERMEDIATE IMAGE GENERATING APPARATUS AND METHOD OF CONTROLLING OPERATION OF SAME

(75) Inventor: Makoto Ooishi, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 381 days.

(21) Appl. No.: 12/764,847

(22) Filed: Apr. 21, 2010

(65) Prior Publication Data

US 2010/0278433 A1 Nov. 4, 2010

(30) Foreign Application Priority Data

May 1, 2009 (JP) ................................ 2009-111816

(51) Int. Cl.
*G06K 9/46* (2006.01)
(52) U.S. Cl. ..... 382/195; 382/203; 382/107; 348/413.1; 348/416.1; 375/240.16
(58) Field of Classification Search .................. 382/195, 382/103, 107, 203, 190, 293; 348/413.1, 348/416.1, 208.14, 578; 345/629, 632; 375/240.16
See application file for complete search history.

(56) References Cited

U.S. PATENT DOCUMENTS

| | | | | |
|---|---|---|---|---|
| 5,241,608 A * | 8/1993 | Fogel | ............................. | 382/107 |
| 5,495,300 A * | 2/1996 | de Haan et al. | ............... | 348/699 |
| 5,625,417 A * | 4/1997 | Lee | ........................... | 375/240.16 |
| 5,627,591 A * | 5/1997 | Lee | ........................... | 375/240.16 |
| 5,638,129 A * | 6/1997 | Lee | ........................... | 375/240.16 |
| 5,701,163 A * | 12/1997 | Richards et al. | ............. | 348/578 |
| 5,757,668 A * | 5/1998 | Zhu | ........................... | 375/240.16 |
| 5,825,917 A * | 10/1998 | Suzuki | ......................... | 382/164 |
| 6,181,747 B1 * | 1/2001 | Burns | ..................... | 375/240.09 |
| 6,414,685 B1 * | 7/2002 | Takakura et al. | ............. | 345/473 |
| 6,526,173 B1 * | 2/2003 | Burns | .......................... | 382/236 |
| 6,625,333 B1 * | 9/2003 | Wang et al. | ................... | 382/300 |
| 6,724,915 B1 * | 4/2004 | Toklu et al. | .................... | 382/103 |
| 7,079,144 B1 * | 7/2006 | Shimada et al. | ............. | 345/442 |
| 7,676,063 B2 * | 3/2010 | Cohen et al. | .................. | 382/103 |
| 7,894,529 B2 * | 2/2011 | Hahn et al. | ................. | 375/240.16 |
| 7,933,332 B2 * | 4/2011 | Schu et al. | ................. | 375/240.16 |
| 2002/0130873 A1 * | 9/2002 | Takakura et al. | ............. | 345/473 |
| 2003/0081679 A1 * | 5/2003 | Kesaniemi | ................ | 375/240.16 |
| 2003/0189980 A1 * | 10/2003 | Dvir et al. | .................. | 375/240.16 |
| 2003/0202780 A1 * | 10/2003 | Dumm et al. | ................. | 386/112 |
| 2004/0252230 A1 * | 12/2004 | Winder | ........................ | 348/402.1 |
| 2005/0093987 A1 * | 5/2005 | Hatanaka et al. | .......... | 348/208.99 |

(Continued)

FOREIGN PATENT DOCUMENTS

JP 3548071 B2 7/2004

(Continued)

*Primary Examiner* — David Ometz
*Assistant Examiner* — Feng Niu
(74) *Attorney, Agent, or Firm* — Birch, Stewart, Kolasch & Birch, LLP

(57) ABSTRACT

An intermediate image is generated between a reference image and a corresponding image. To achieve this, moving subject images are detected in respective ones of a first image and second image captured at a fixed interval. A moving subject image of an intermediate image is positioned at a position that is intermediate the moving subject images. The intermediate image is generated utilizing the reference image in a portion of the image other than occupied by the moving subject image. A correction is applied in such a manner that the second image will coincide with the first image with the exception of the portion of the second image occupied by the moving subject image.

6 Claims, 14 Drawing Sheets

U.S. PATENT DOCUMENTS

| | | | | |
|---|---|---|---|---|
| 2005/0238101 A1* | 10/2005 | Schu et al. | | 375/240.16 |
| 2006/0072664 A1* | 4/2006 | Kwon et al. | | 375/240.16 |
| 2006/0274834 A1* | 12/2006 | Hahn et al. | | 375/240.16 |
| 2006/0285595 A1* | 12/2006 | Ha et al. | | 375/240.16 |
| 2007/0189386 A1* | 8/2007 | Imagawa et al. | | 375/240.12 |
| 2007/0297513 A1* | 12/2007 | Biswas et al. | | 375/240.16 |
| 2008/0008243 A1* | 1/2008 | Ozdemir | | 375/240.16 |
| 2008/0211968 A1* | 9/2008 | Murakami et al. | | 348/699 |
| 2008/0231745 A1* | 9/2008 | Ogino et al. | | 348/441 |
| 2008/0304568 A1* | 12/2008 | Chang | | 375/240.16 |
| 2008/0317127 A1* | 12/2008 | Lee et al. | | 375/240.16 |
| 2009/0147132 A1* | 6/2009 | Sato et al. | | 348/451 |
| 2009/0208137 A1* | 8/2009 | Urushihara et al. | | 382/300 |
| 2009/0274434 A1* | 11/2009 | Mei et al. | | 386/52 |
| 2010/0008424 A1* | 1/2010 | Pace | | 375/240.16 |
| 2010/0079665 A1* | 4/2010 | Yamauchi et al. | | 348/416.1 |
| 2010/0104140 A1* | 4/2010 | Cho et al. | | 382/107 |
| 2010/0271501 A1* | 10/2010 | Ooishi | | 348/222.1 |

FOREIGN PATENT DOCUMENTS

JP 3873017 B2 1/2007

* cited by examiner

REFERENCE IMAGE

CORRESPONDING IMAGE

REFERENCE IMAGE

CORRESPONDING IMAGE

REFERENCE IMAGE

CORRESPONDING IMAGE

REFERENCE IMAGE

CORRESPONDING IMAGE

INTERMEDIATE IMAGE GENERATING APPARATUS AND METHOD OF CONTROLLING OPERATION OF SAME

BACKGROUND OF THE INVENTION

1. Field of the Invention

This invention relates to an apparatus for generating an intermediate image and to a method of controlling the operation of this apparatus.

2. Description of the Related Art

When a moving image is captured, the subject is captured at a fixed period. Although a moving image featuring fine motion is obtained if the capture period is shortened, there are instances where it is difficult to shorten the capture period. For this reason, there are occasions where an intermediate image is generated between two adjacent image frames obtained by image capture and the intermediate image is inserted between these two image frames.

Various methods of generating such an intermediate image have been considered (see the specifications of Japanese Patent Nos. 3548071 and 3873017). However, there is still room for improvement in terms of generating an intermediate image with regard to the image of a moving subject.

SUMMARY OF THE INVENTION

Accordingly, an object of the present invention is to generate an intermediate image with regard to the image of a moving subject.

According to the present invention, the foregoing object is attained by providing an intermediate image generating apparatus comprising: a first feature point deciding device (first feature point deciding means) for deciding a plurality of feature points, which indicate the shape features of a subject, from within a first image, wherein the first image and a second image have been obtained by continuous shooting; a first corresponding point deciding device (first corresponding point deciding means) for deciding corresponding points, which correspond to the feature points decided by the first feature point deciding device, from within the second image; a moving subject image detecting device (moving subject image detecting means) for detecting moving subject images in respective ones of the first and second images, the moving subject images being subject images contained in the first and second images and representing an object moving from capture of the first image to capture of the second image; a transformation target area setting device (transformation target area setting means) for setting transformation target areas in respective ones of the first and second images, the transformation target areas enclosing both the positions of feature points, which are present in the moving subject image detected by the moving subject image detecting device, from among the feature points decided by the first feature point deciding device, and the positions of corresponding points, which are present in the moving subject image detected by the moving subject image detecting device, from among the corresponding points decided by the first corresponding point deciding device; a second feature point deciding device (second feature point deciding means) for deciding a plurality of feature points of an image within the transformation target area of the first image set by the transformation target area setting device; a second corresponding point deciding device (second corresponding point deciding means) for deciding corresponding points, which correspond to the feature points decided by the second feature point deciding device, in an image within the transformation target area of the second image set by the transformation target area setting device; an intermediate moving subject image generating device (intermediate moving subject image generating means) for generating an intermediate moving subject image by transforming the image within the transformation target area of the first image or second image in such a manner that this image is positioned at intermediate points present at a positions that are intermediate the feature points decided by the second feature point deciding device and the corresponding points decided by the second corresponding point deciding device; and an intermediate image generating device (intermediate image generating means) for generating an image that is intermediate the first and second images using the intermediate moving image generated by the intermediate moving image generating device.

The present invention also provides an operation control method suited to the intermediate image generating apparatus described above. Specifically, a method of controlling an apparatus for generating an intermediate image comprises the steps of: deciding a plurality of feature points, which indicate the shape features of a subject, from within a first image, wherein the first image and a second image have been obtained by continuous shooting; deciding corresponding points, which correspond to the feature points that have been decided, from within the second image; detecting moving subject images in respective ones of the first and second images, the moving subject images being subject images contained in the first and second images and representing an object moving from capture of the first image to capture of the second image; setting transformation target areas in respective ones of the first and second images, the transformation target areas enclosing both the positions of feature points, which are present in the moving subject image that has been detected, from among the feature points that have been decided, and the positions of corresponding points, which are present in the moving subject image that has been detected, from among the corresponding points that have been decided; deciding a plurality of feature points of an image within the set transformation target area of the first image; deciding corresponding points, which correspond to the feature points that have been decided, in an image within the set transformation target area of the second image; generating an intermediate moving subject image by transforming the image within the transformation target area of the first image or second image in such a manner that this image is positioned at intermediate points present at positions that are intermediate the feature points that have been decided and the corresponding points that have been decided; and generating an image that is intermediate the first and second images using the intermediate moving image that has been generated.

The present invention also provides a recording medium storing a computer-readable program suited to implementation of the above-described method of controlling the operation of an intermediate image generating apparatus. The present invention may provide the program per se.

In accordance with the present invention, first and second images are obtained by continuous shooting. A plurality of feature points are decided from within the first image. (The feature points are points on the contours of a plurality of subject images contained in an image, points at which the shape of a subject image changes, etc.) Corresponding points that correspond to the decided feature points are decided from within the second image.

Moving subject images, which are subject images contained in the first and second images and represent an object moving from capture of the first image to capture of the second image, are detected in respective ones of the first and second images. A transformation target area that encloses the positions of feature points present in the detected moving subject image and the positions of corresponding points present in the detected moving subject image is decided in each of the first and second images.

Feature points of the image within the transformation target area in the first image are decided. The corresponding points that correspond to the features points of the image within the transformation target area of the first image are decided with regard to the image within the transformation target area in the second image. The image within the transformation target area of the first image or second image is transformed so as to be positioned at intermediate points present at positions that are intermediate the feature points of the image within the transformation target area of the first image and the corresponding points of the image within the transformation target area of the second image.

When moving subject images are detected in respective ones of the first and second images, feature points of the moving subject image in the first image and the corresponding points of the moving subject image in the second image are detected. An intermediate moving subject image is generated so as to be positioned at intermediate points present at positions that are intermediate the detected feature points of the moving subject image of the first image and corresponding points of the moving subject image of the second image. The intermediate moving subject image may be generated by transforming the moving subject image contained in the first image or transforming the moving subject image contained in the second image. Thus it is possible to generate a moving subject image contained in an image that is intermediate the moving subject image contained in the first image and the moving subject image contained in the second image. An image intermediate the first and second images is generated using the intermediate moving subject image thus generated.

The apparatus further comprises an external-area image portion transforming device for transforming the second image in such a manner that the corresponding points decided by the first corresponding point deciding device will coincide with the feature points decided by the first feature point deciding device with regard to an external-area image portion that is external to the transformation target area.

In this case, by way of example, with regard to the interior of the transformation target area, the intermediate image generating device would generate the image intermediate the first and second images using the intermediate moving subject image generated by the intermediate moving subject image generating device, and with regard to the image portion exterior to the transformation target area, the intermediate image generating device would generate the image intermediate the first and second images using the first image or the image portion, external to the transformation target area, generated by the external-area image portion transforming device.

The moving subject image detecting device detects the moving subject images based upon motion that is different from motion of the total of the plurality of feature points decided by the first feature point deciding device and corresponding points decided by the first corresponding point deciding device, by way of example.

The moving subject image detecting device detects the moving subject images based upon motion that is different from motion of the total of the plurality of feature points decided by the first feature point deciding device and corresponding points decided by the first corresponding point deciding device, with the proviso that the number of corresponding points that undergo this different motion is greater than a prescribed number.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

Figure 1:
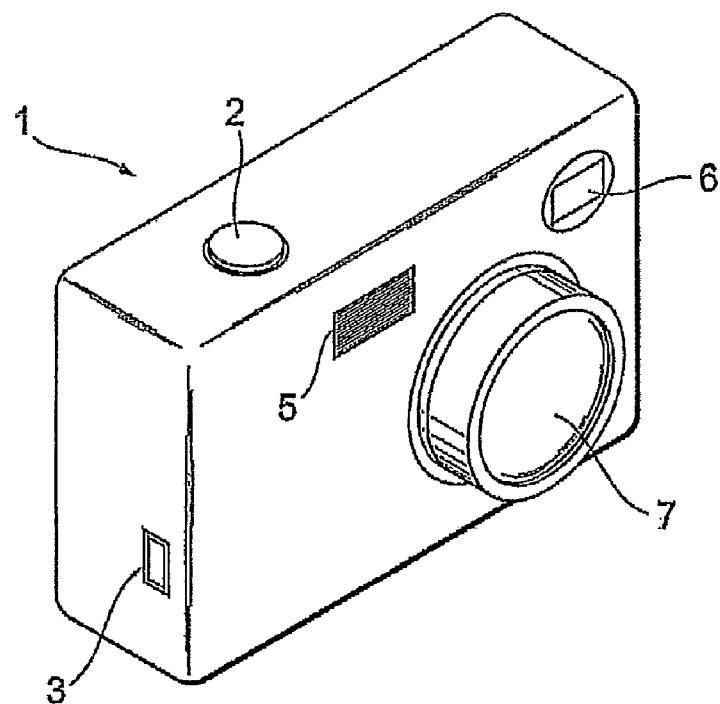
FIG. 1 is a perspective view of a digital movie/still camera as seen from the front.

FIG. 1, which illustrates a preferred embodiment of the present invention, is a perspective view of a digital movie/still camera 1 as seen from the front.

The top of the digital movie/still camera 1 is formed to have a shutter-release button 2. The right side face of the digital movie/still camera 1 is formed to have a terminal 3 for connecting a USB (Universal Serial Bus) cable.

The front side of the digital movie/still camera 1 is formed to have a zoom lens 7, an electronic flash 5 is formed at the upper left of the zoom lens 7, and an optical viewfinder 6 is formed at the upper right of the zoom lens 7.

Figure 2:
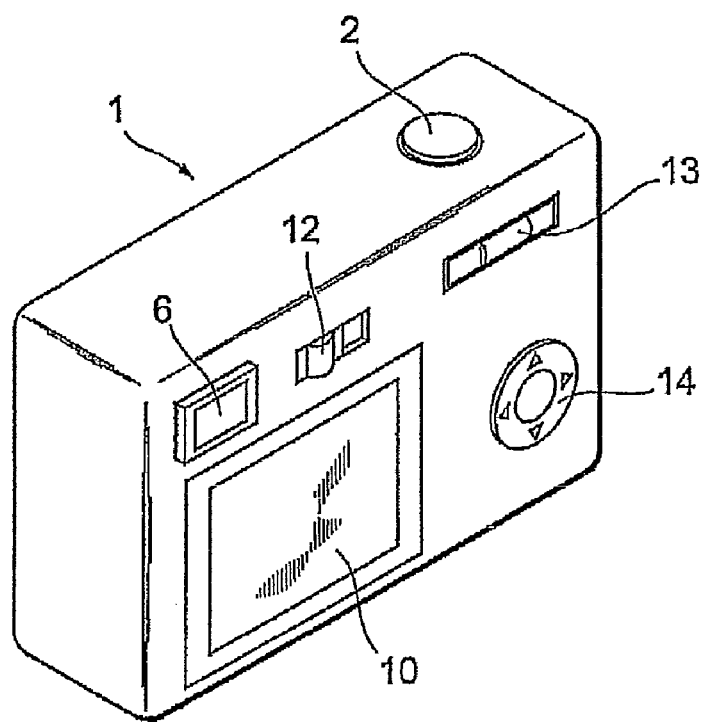
FIG. 2 is a perspective view of the digital movie/still camera as seen from the back.

FIG. 2 is a perspective view of the digital movie/still camera 1 as seen from the back.

A liquid crystal display screen 10 is formed on the back side of the digital movie/still camera 1 at the lower left thereof, a power switch 12 is formed on the right side of the optical viewfinder 6, and a mode switch 13 is formed on the right side of the power switch 12. An shooting mode (movie shooting mode and still shooting mode) and a playback mode are set by the mode switch 13. Provided below the mode switch 13 is a circular button 14 on which arrows are formed on up, down, left and right portions thereof. Other modes can be set using the button 14.

Figure 3:
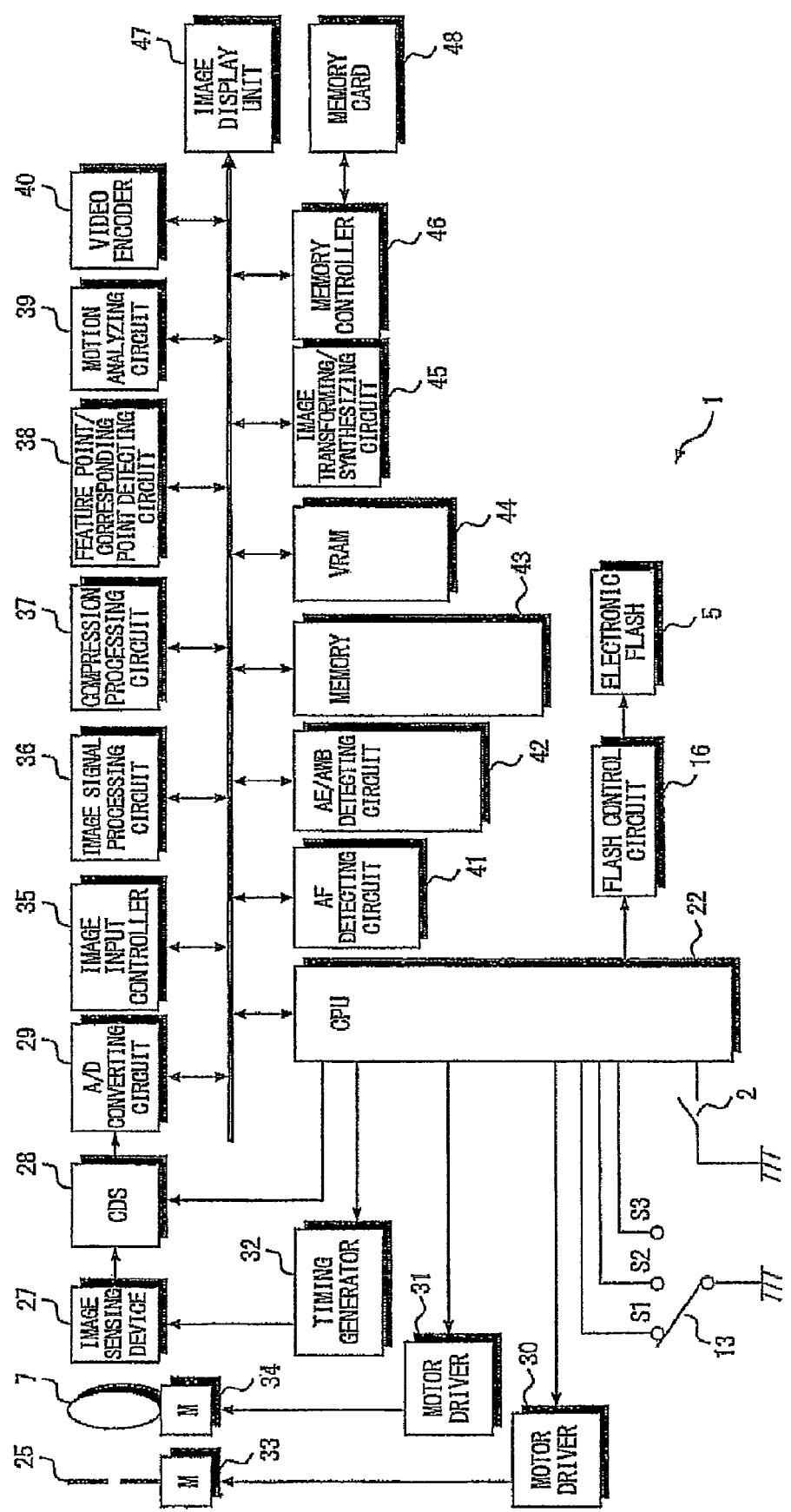
FIG. 3 is a block diagram illustrating the electrical configuration of the digital movie/still camera.

FIG. 3 is a block diagram illustrating the electrical configuration of the digital movie/still camera 1.

The overall operation of the digital movie/still camera 1 is controlled by a CPU 22.

The digital movie/still camera 1 includes a memory 43 in which an operation program and other data, described later, have been stored. The operation program may be written to a memory card 48 or the like, read out of the memory card 48 and installed in the digital movie/still camera 1, or the operation program may be pre-installed in the camera.

The digital movie/still camera 1 includes a shutter-release button 2 and a mode switch 13. A signal indicating pressing of the shutter-release button 2 is input to the CPU 22. The mode switch 13, which selects the movie shooting mode, still shooting mode or playback mode, is capable of turning on a switch S1, S2 or S3 selectively. The movie shooting mode is set by turning on the switch S1, the still shooting mode by turning on the switch S2 and the playback mode by turning on the switch S3.

The digital movie/still camera 1 is capable of flash photography. The electronic flash 5 is provided to achieve this, as described above. A light emission from the electronic flash 5 is turned on and off under the control of a flash control circuit 16.

An iris 25 and a zoom lens 7 are provided in front of a solid-state electronic image sensing device 27 such as a CCD. The iris 25 has its f-stop decided by a motor 33 controlled by a motor driver 30. The zoom lens 7 has its zoom position decided by a motor 34 controlled by a motor driver 31.

If the movie or still shooting mode is set by the mode switch 13, light representing the image of a subject that has passed through the iris 25 forms an image on the photoreceptor surface of the image sensing device 27 by the zoom lens 7. The image sensing device 27 is controlled by a timing generator 32 and the image of the subject is captured at a fixed period (a period of 1/30 of a second, by way of example). A video signal representing the image of the subject is output from the image sensing device 27 at a fixed period and is input to a CDS (correlated double sampling) circuit 28. The video signal that has been subjected to correlated double sampling in the CDS circuit 28 is converted to digital image data in an analog/digital converting circuit 29.

The digital image data is input to an image signal processing circuit 36 by an image input controller 35 and is subjected to prescribed signal processing such as a gamma correction. The digital image data is written to a VRAM (video random-access memory) 41, after which this data is read out and applied to an image display unit 47, whereby the image data is displayed as a moving image on the display screen of the image display unit 47.

In the digital movie/still camera 1 according to this embodiment, an intermediate image (interpolated image), namely an image that is intermediate first and second images, can be generated from the first and second images. In the generating of the intermediate image, feature points on the contour, etc., of a subject image contained in the first image are decided and corresponding points corresponding to these feature points are decided in the second image. The second image is positioned in such a manner that the corresponding points will coincide with the feature points. As a result, camera shake between the capture of the first image and the capture of the second image is corrected.

Further, in a case where an object moving from capture of the first image to capture of the second image exists, the motion of the image of the object is analyzed and the position of a moving subject image in the intermediate image is decided midway between the moving subject image in the first image and the moving subject image in the second image.

In order to generate such an intermediate image, the digital movie/still camera 1 is provided with a feature point/corresponding point detecting circuit 38, a motion analyzing circuit 39 and an image transforming/synthesizing circuit 45.

The digital image data obtained by image capture is input to an AF (autofocus) detecting circuit 41. The zoom position of the zoom lens 7 is controlled in the AF detecting circuit 41 so as to bring the image into focus. Further, the digital image data obtained by image capture is input also to an AE (automatic exposure)/AWB (automatic white balance) detecting circuit 42. The AE/AWB detecting circuit 42 decides the aperture of the iris 25 in such a manner that detected brightness will become an appropriate brightness. A white-balance adjustment is also carried out in the AE/AWB detecting circuit 42.

If the shutter-release button 2 is pressed in the still shooting mode, one frame of image data obtained by image capture at that moment is input to a compression processing circuit 37. The image data that has been subjected to prescribed compression processing in the compression processing circuit 37 is input to a video encoder 40 and is encoded thereby. The encoded image data is recorded on the memory card 48 under the control of a memory controller 46. In the movie shooting mode, image data that has been obtained by image capture during depression of the shutter-release button 2 is recorded on the memory card 48 as moving image data.

If the playback mode is set by the mode switch 13, the image data that has been recorded on the memory card 48 is read. The image represented by the read image data is displayed on the display screen of the image display unit 47.

Figure 4:
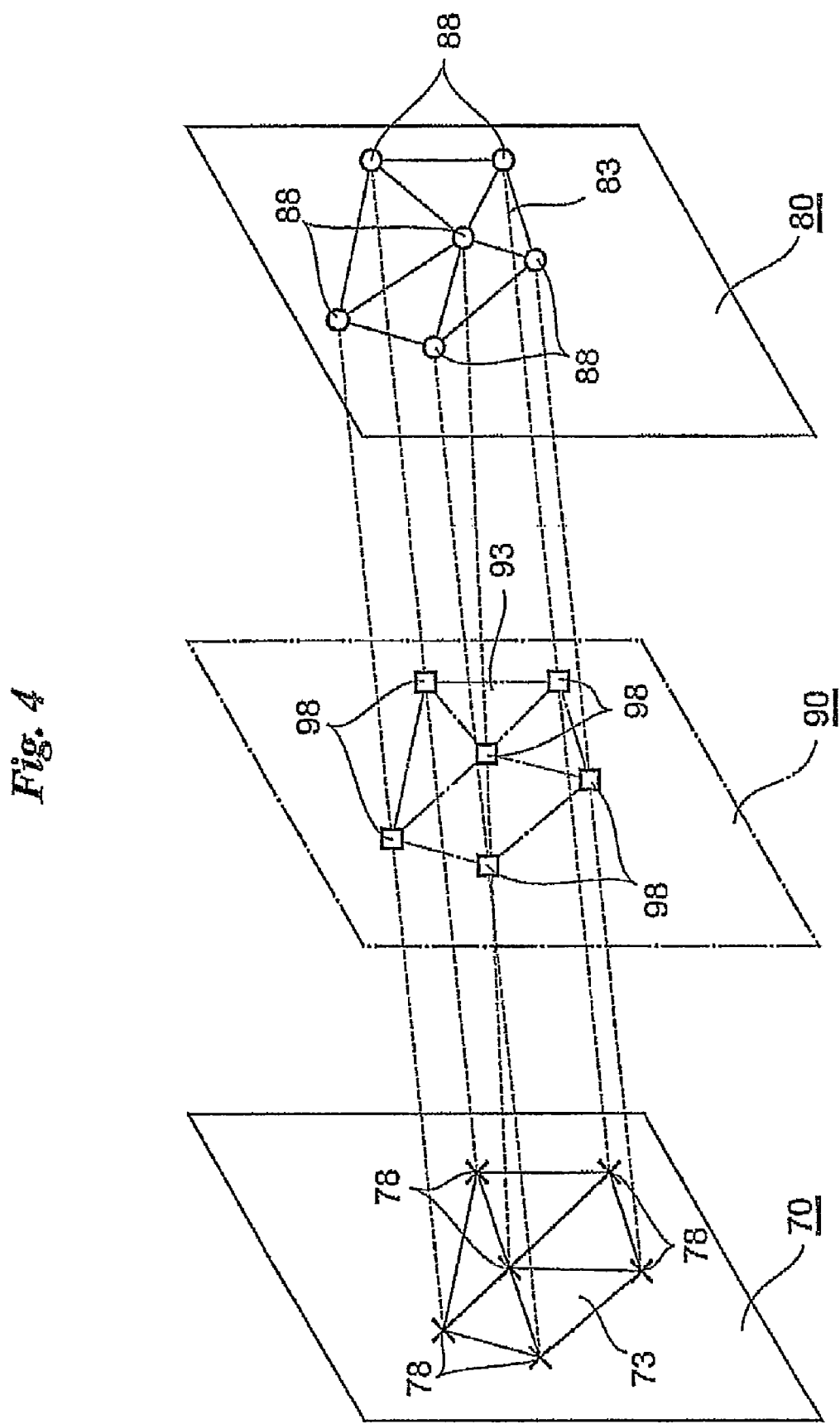
FIG. 4 illustrates the manner in which an intermediate image is generated.

FIG. 4 illustrates the manner in which an intermediate image is generated.

In this embodiment, an image 90 that is intermediate a first image 70 and a second image 80 is generated from the first image 70 and the second image 80, as mentioned earlier. Although the first image 70 and the second image 80 are images the shooting interval of which is a fixed length of time in the manner of two successive image frames in a moving image, they need not necessarily be two successive image frames.

In particular, in this embodiment, if the intermediate image 90 has been generated in a case where the first image 70 contains a subject image 73 that moves in the manner of an automobile and the second image 80 also contains an identical moving subject image 83, then a moving subject image 93 is positioned at position where it should be present in the intermediate image 90. The moving subject image will be seen to move without appearing unnatural if the first image 70, intermediate image 90 and second image 80 are viewed successively. Feature points 78 are decided in the moving subject image 73 and corresponding points 88 are decided in the moving subject image 83 in a manner described later in greater detail. Corresponding points 98, which define the moving subject image 93 of the intermediate image 90, are decided from the feature points 78 and corresponding points 88 that have been decided. The moving subject image 93 is positioned at the positions defined by the corresponding points 93 that have been decided.

Furthermore, in this embodiment, in order that an image portion such as the background or foreground of a moving subject image will be corrected for a shift in position ascribable to camera shake or the like, a shake correction is carried out in such a manner that the portion of the second image 80 that does not include the moving subject image 83 will coincide with the portion of the first image 70 that does not include the moving subject image 73. Since the portions of the first image 70 and second image 80 in which the subject is not moving will coincide, blur due to image shake can be prevented. With regard also to the portion of the intermediate image 90 that does not include the moving subject image 93, it goes without saying that this portion is generated in such a manner that it will coincide with the portion of the first image 70 or second image 80 that is devoid of motion.

Figure 5:
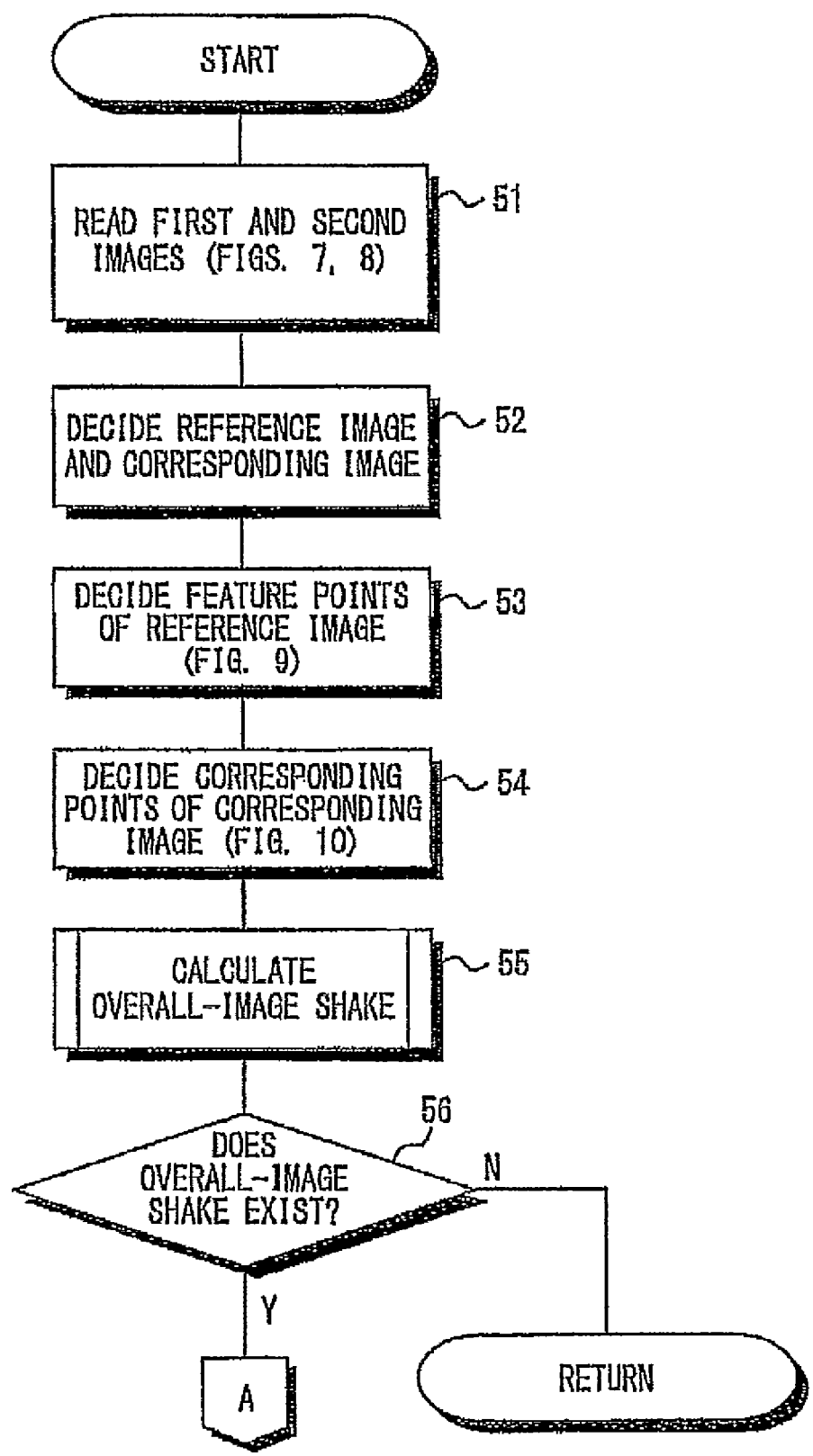
FIGS. 5 to 6 are flowcharts illustrating processing executed by the digital movie/still camera.
Figure 6:
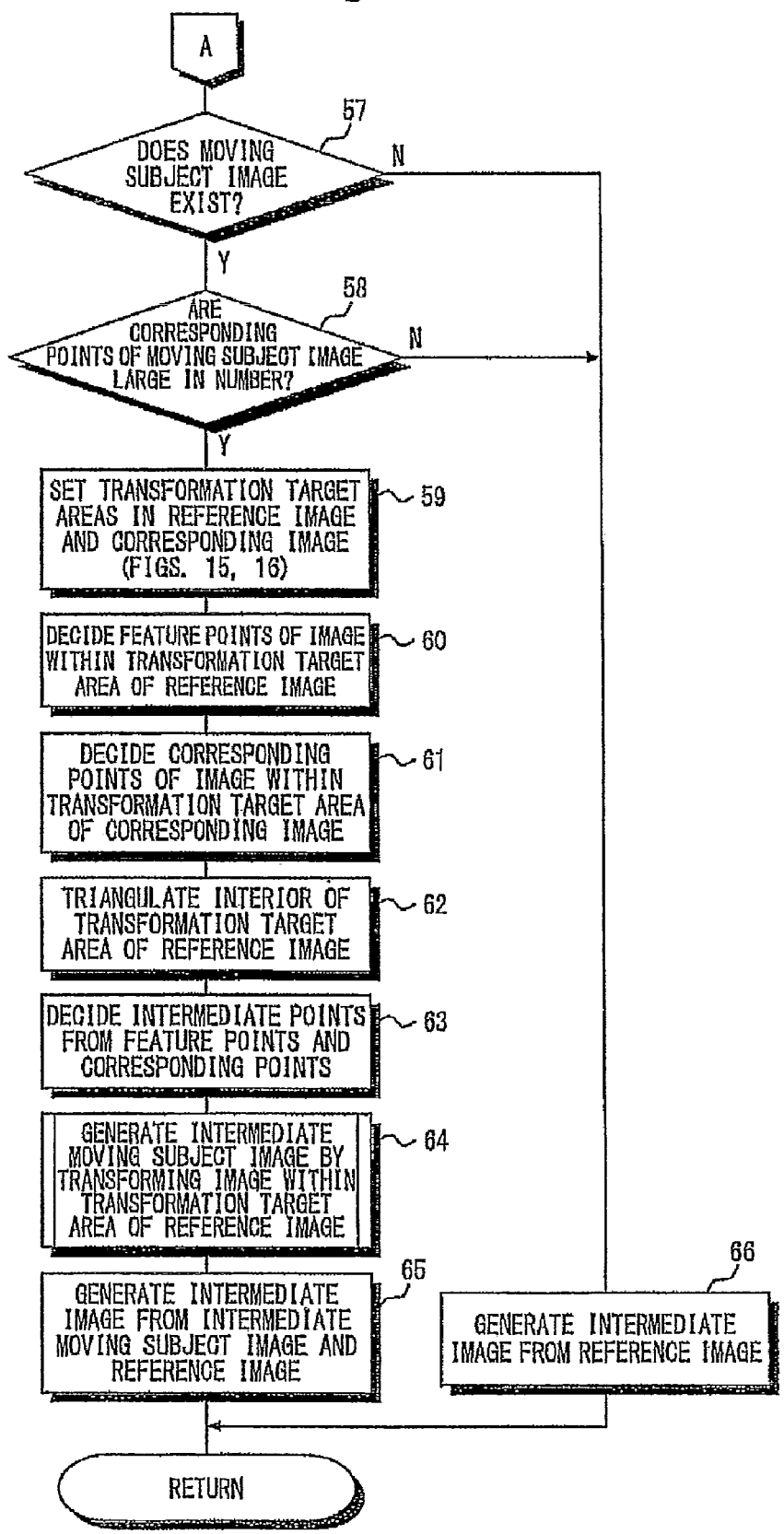

FIGS. 5 and 6 are flowcharts illustrating processing executed by the digital movie/still camera 1.

First and second images are obtained from the memory card 48 (step 51 in FIG. 5).

Figure 7:
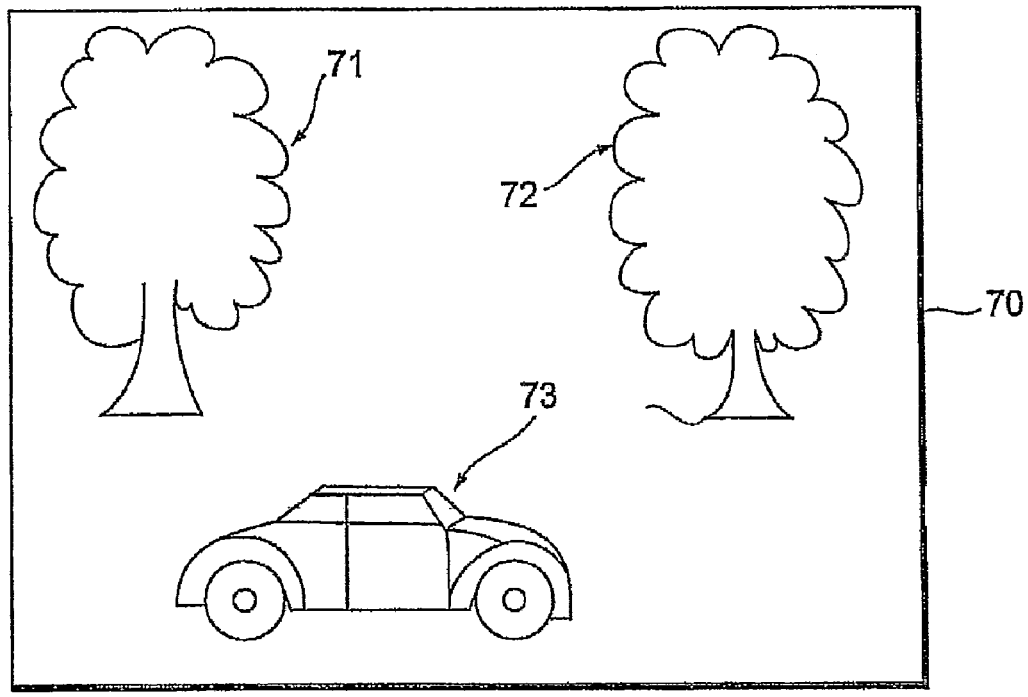
FIGS. 7 to 11 are examples of subject images.
Figure 8:
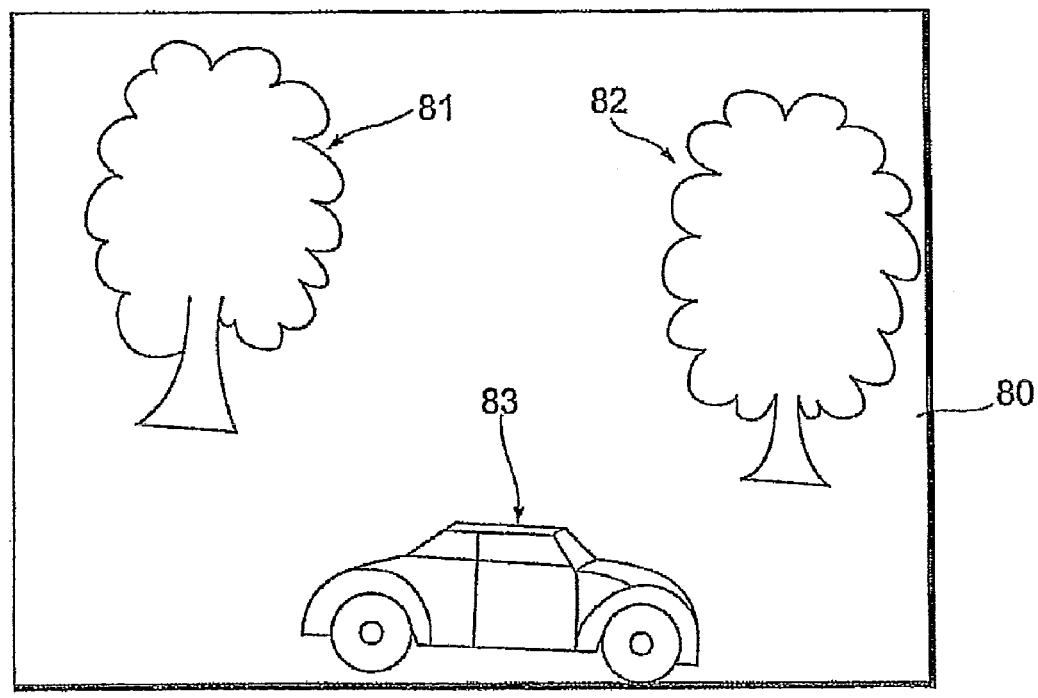

FIG. 7 is an example of the first image and FIG. 8 an example of the second image.

As shown in FIG. 7, the image 73 of an automobile is displayed toward the front of the first image 70 and images 71 and 72 of trees are displayed in back.

In FIG. 8, the second image 80 has been captured after the first image 70. Since the first image 70 and second image 80 have not been captured simultaneously, a shift ascribable to camera shake occurs between the first image 70 and second image 80 and the second image 80 is tilted in comparison with the first image 70. The image 83 of the automobile is displayed toward the front of the second image 80 as well and images 81 and 82 of trees are displayed in back.

The images 71 and 72 of the trees in the first image 70 are the same as the images 81 and 82, respectively, of the trees in the second image 80, and the image 73 of the automobile in the first image 70 and the image 83 of the automobile in the second image 80 are images of the same automobile.

When the first image 70 and second image 80 are obtained, a reference image and a corresponding image are decided (step 52 in FIG. 5). In this embodiment, the first image 70 is adopted as the reference image and the second image 80 is adopted as the corresponding image. However, the reverse may just as well be adopted.

When the reference image and corresponding image are decided, the feature points of the reference image are decided in a manner described next (step 53 in FIG. 5). Further, the corresponding points of the corresponding image are decided (step 54 in FIG. 5).

Figure 9:
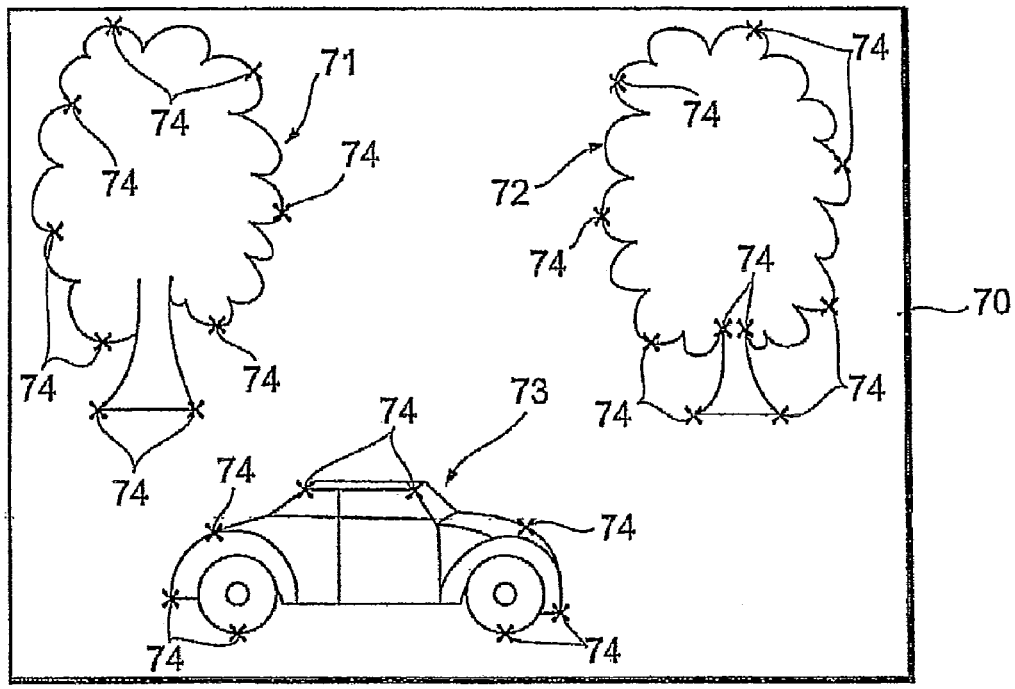

FIG. 9 illustrates the reference image (first image) 70.

The reference image 70 contains the images 71 and 72 of the trees and the image 73 of the automobile. A feature point defines one point on the contour of the subject image contained in the reference image 70 and indicates the characteristic shape of the subject image. A plurality of corresponding points 74 are decided with regard to each of the images 71 and 72 of the trees and image 73 of the automobile.

Figure 10:
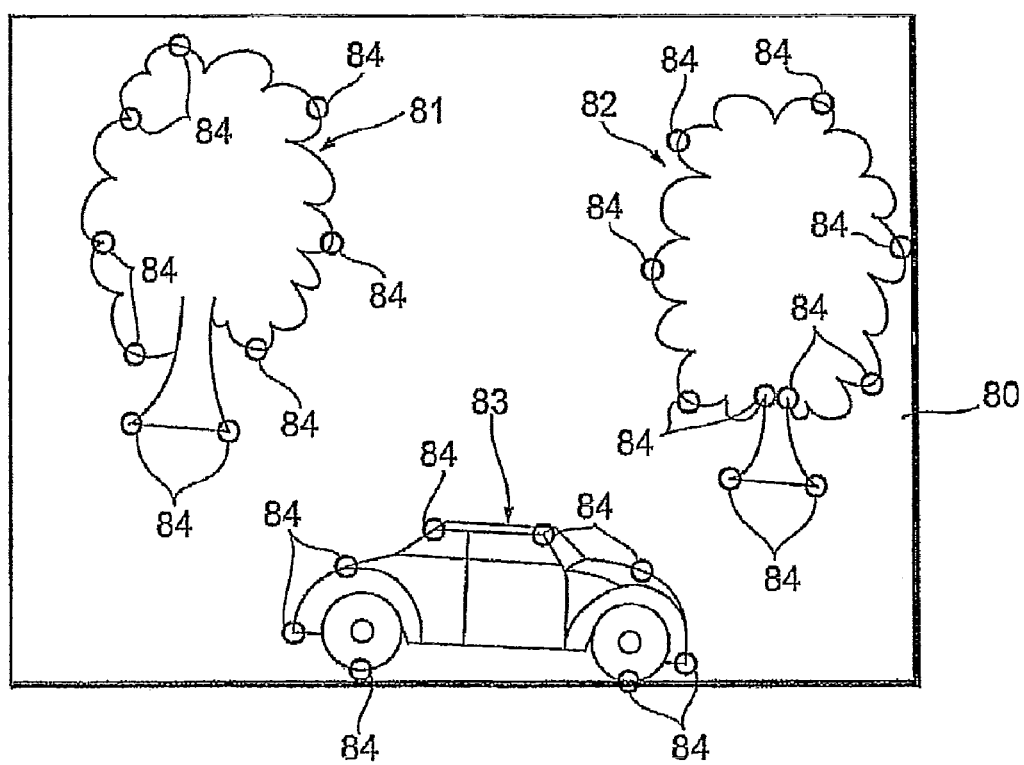

FIG. 10 illustrates the corresponding image (second image) 80.

Corresponding points indicate the points of pixels that correspond to the feature points decided in the reference image 70. Corresponding points 84 corresponding to the feature points 74 are decided with regard to each of the images 81 and 82 of the trees and image 83 of the automobile contained in the corresponding image 80.

Next, overall-image shake between the reference image 70 and corresponding image 80 is calculated (step 55 in FIG. 5). The calculation of shake of the overall image (calculation of amount and direction of shake) will be described in detail later. The corresponding image 80 is corrected in accordance with the calculated image shake. The shake correction may be performed when the reference image 70 and corresponding image 80 are superimposed.

Figure 11:
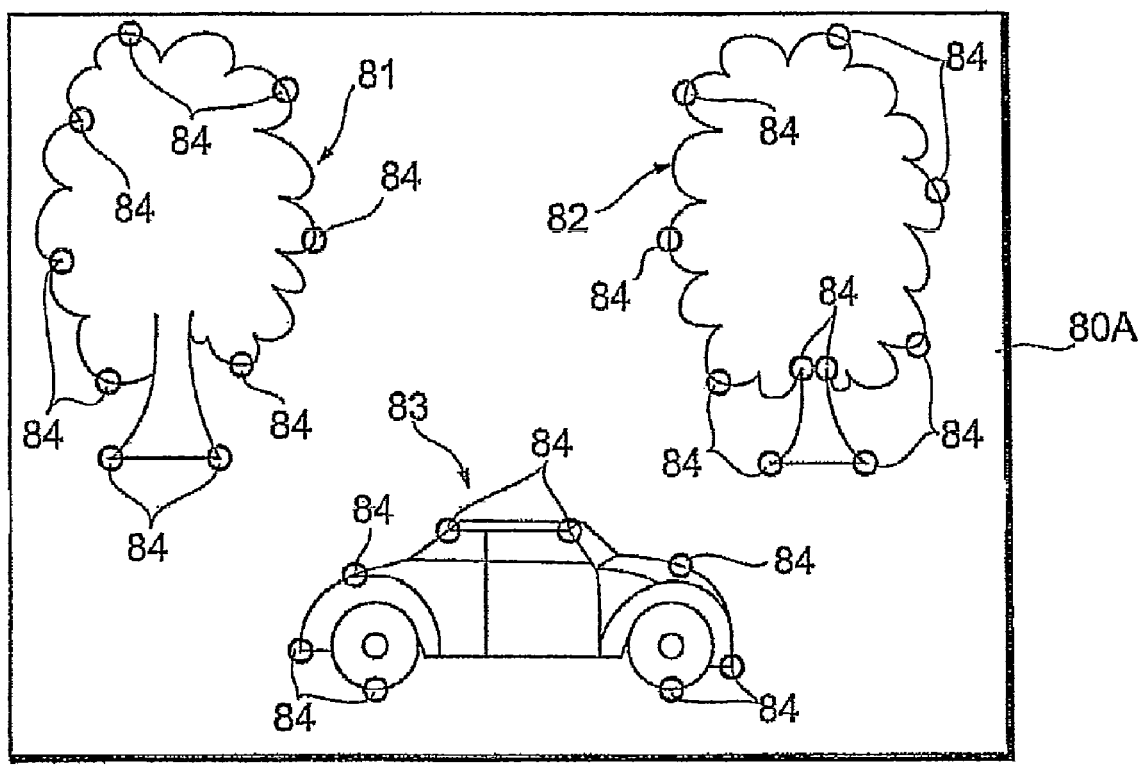

FIG. 11 is an example of a corresponding image 80A that has undergone a correction for shake. The shift between this image and the reference image 70 has been corrected by the shake) correction.

Figure 12:
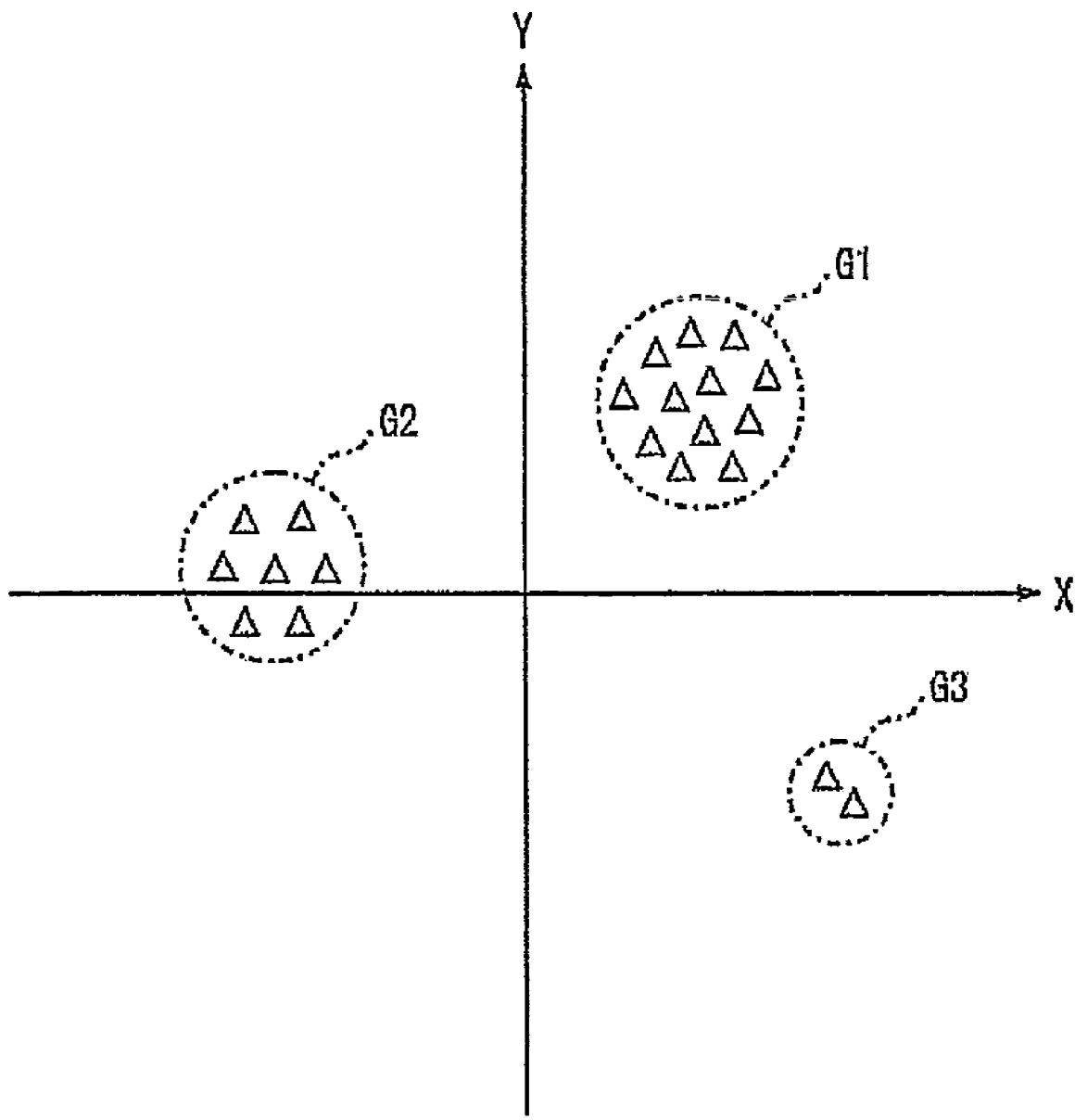
FIG. 12 illustrates camera shake and shift of a moving object.

FIG. 12 illustrates an optical flow graph.

This optical flow graph is such that the amount and direction of shift of the corresponding points, which correspond to the feature points, from these feature points is indicated by marks placed at every feature point (corresponding point). Three groups of marks are indicated in this optical flow graph. Assume that a first group G1 has the largest number of marks, a second group G2 has the next largest number of marks and a third group G3 has a very small number of marks. In this embodiment, it is determined that what is represented by the first group G1, which has the largest number of marks, is the overall-image shift between the reference image 70 and corresponding image 80. Further, it is determined that what is represented by the second group G2, in which the number of marks is greater than a prescribed number, is the amount and direction of movement of the subject image of the moving object that has moved between capture of the reference image 70 and capture of the corresponding image 80. What is represented by the third group G3, in which the number of marks is less than a prescribed number, is treated as garbage and is determined not to represent a moving subject image.

If overall-image shake exists ("YES" at step 56 in FIG. 5), then it is determined whether a subject image (moving subject image) representing an object that has moved from capture of the reference image 70 to capture of the corresponding image 80 exists in the corresponding image 80 (step 57 in FIG. 6). In this embodiment, the image 73 of the automobile is contained in the reference image 70, the image 83 of the automobile is contained also in the corresponding image 80, and the automobile is moving from capture of the reference image 70 to capture of the corresponding image 80. Accordingly, a determination is made that a moving subject image exists (step 57 in FIG. 6).

Next, whether the corresponding points of the moving subject image are large in number (greater than a prescribed number) is checked (step 58 in FIG. 6). If a large number of corresponding points do not exist, then the subject image portion represented by these corresponding points is considered to be a moving subject image owing to the effects of garbage and therefore is eliminated.

Figure 13:
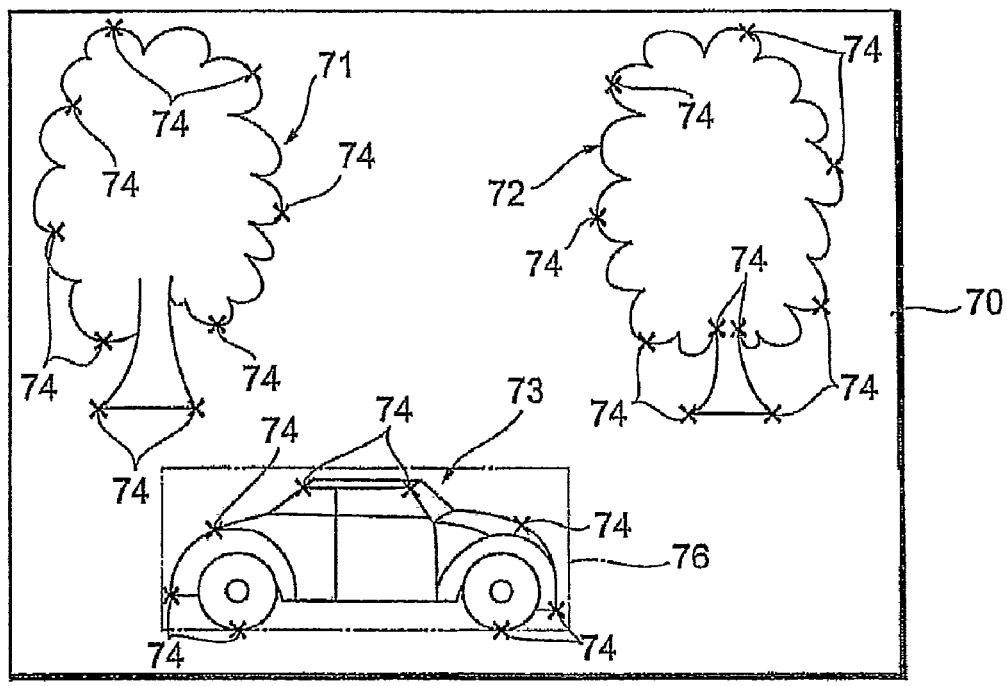
FIGS. 13 to 16 are examples of subject images.
Figure 14:
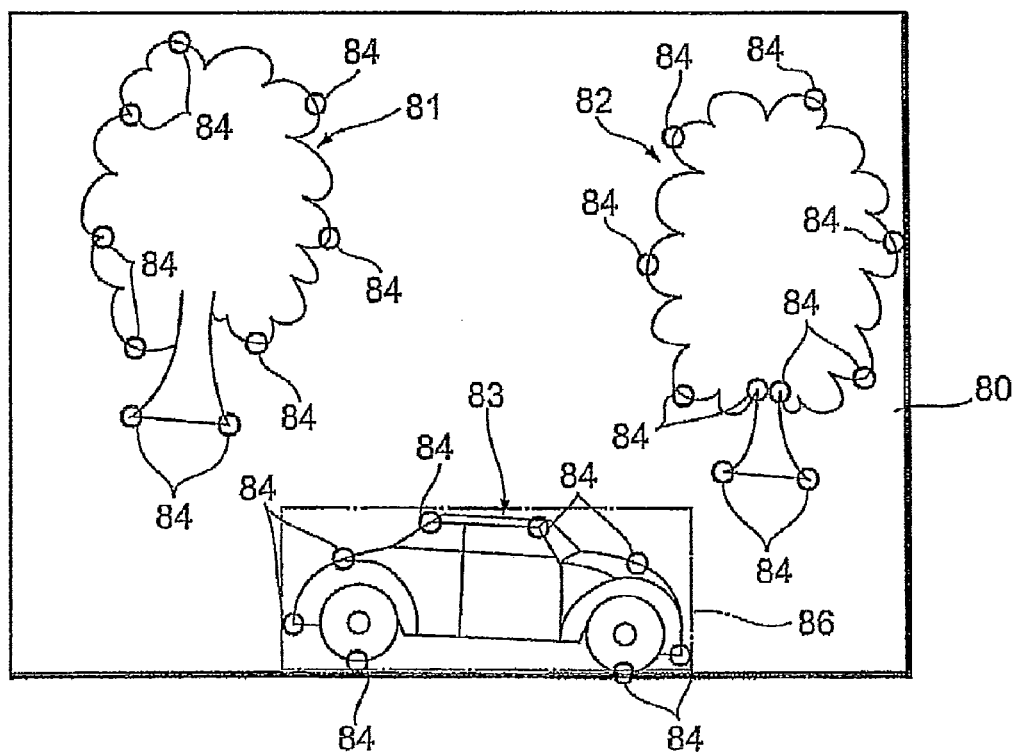

FIG. 13 illustrates a moving-portion area 76, which encloses the moving subject image (the image of the automobile) 73 determined as described above, in the reference image 70. FIG. 14 illustrates a moving-portion area 86 that encloses the moving subject image 83 in the corresponding image 80.

Since the automobile is moving, there is a shift between the position of the moving-portion area 76 shown in FIG. 13 and the position of the moving-portion area 86 shown in FIG. 14, and the shift depends upon the amount and direction of movement of the automobile. In this embodiment, a transformation target area that encloses both of the moving-portion areas 76 and 86 is set (step 59 in FIG. 6).

Figure 15:
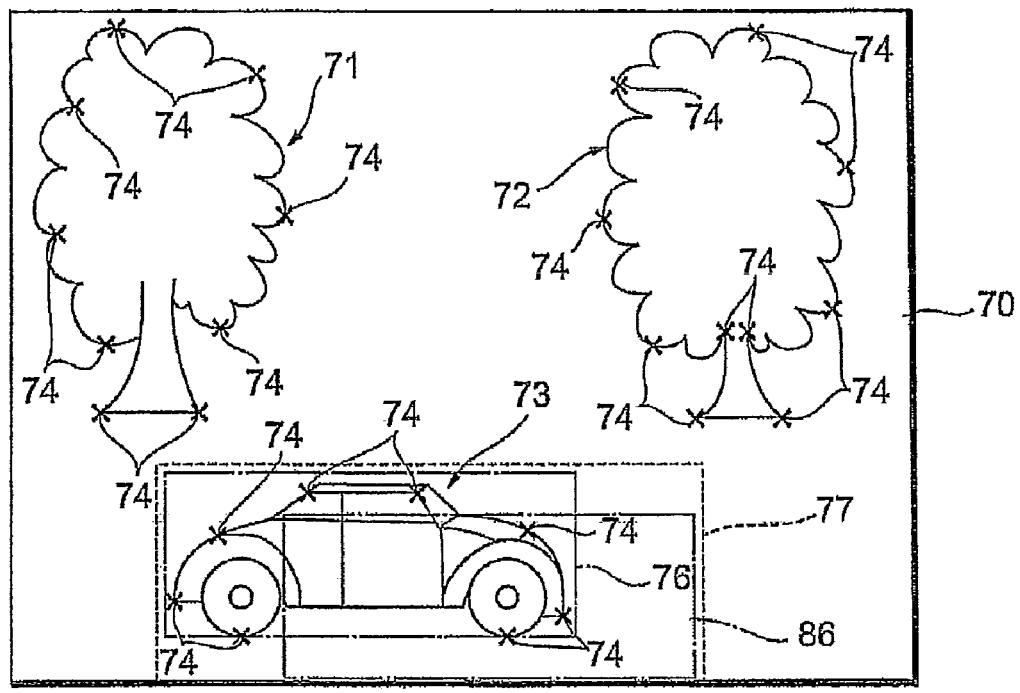

FIG. 15 illustrates a transformation target area 77 that has been set in the reference image 70. Further, in order to make it easy to understand that the transformation target area 77 encloses the moving-portion area 76 in the reference image 70 and the moving-portion area 86 in the corresponding image 80, the moving-portion area 86 in the corresponding image 80 is also shown in FIG. 15 in addition to the moving-portion area 76 in the reference image 70.

Figure 16:
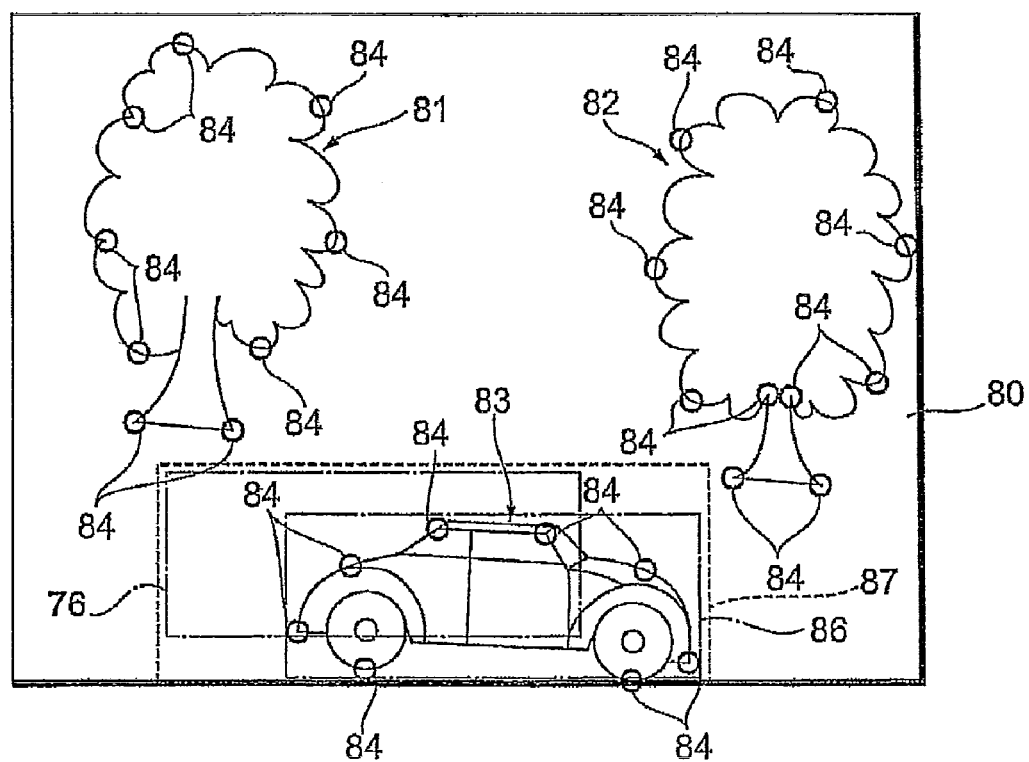

FIG. 16 illustrates a transformation target area 87 that has been set in the corresponding image 80. Further, in order to make it easy to understand that the transformation target area 87 encloses the moving-portion area 76 in the reference image 70 and the moving-portion area 86 in the corresponding image 80, the moving-portion area 76 in the reference image 70 is also shown in FIG. 16 in addition to the moving-portion area 86 in the corresponding image 80.

Next, feature points of the image within the transformation target area 77 of the reference image 70 are decided anew (step 60 in FIG. 6). Further, corresponding points of the image within the transformation target area 87 of the corresponding image 80, which points corresponds to the feature points within the transformation target area 77 of the reference image 70, are decided anew (step 61 in FIG. 6).

Figure 17:
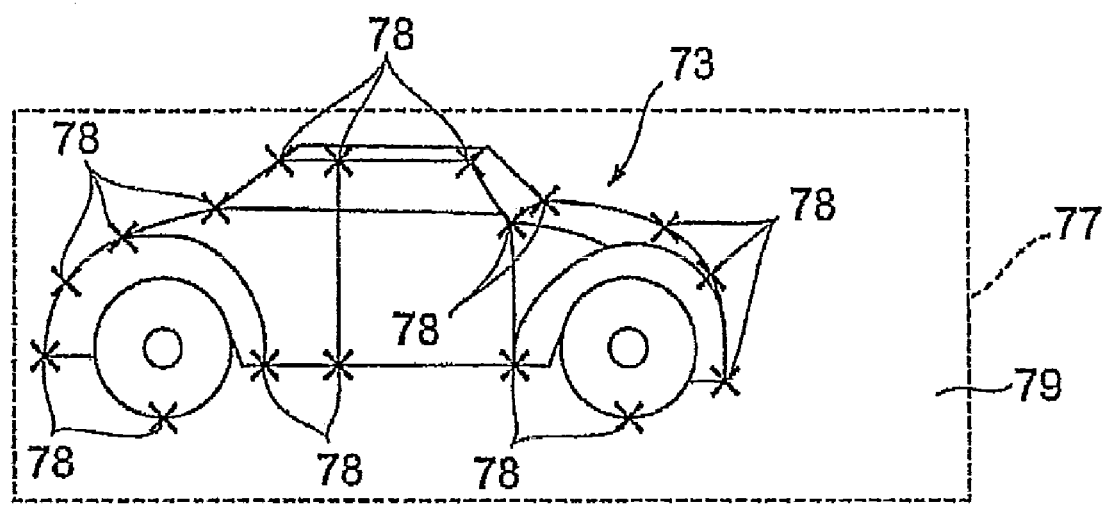
FIGS. 17 to 20 illustrate images within transformation target areas.

FIG. 17 illustrates an image 79 within the transformation target area 77 of the reference image 70.

The image 79 within the transformation target area 77 contains the image 73 of the automobile. A plurality of the feature points 78 are decided with regard to the image of the automobile. Preferably, the feature points 78 are taken at intervals smaller than the intervals of the feature points that have been decided with regard to the overall reference image 7 in the manner shown in FIG. 9. The reason is that in a case where an image transformation is performed, a more detailed image transformation can be achieved, as will be described later.

Figure 18:
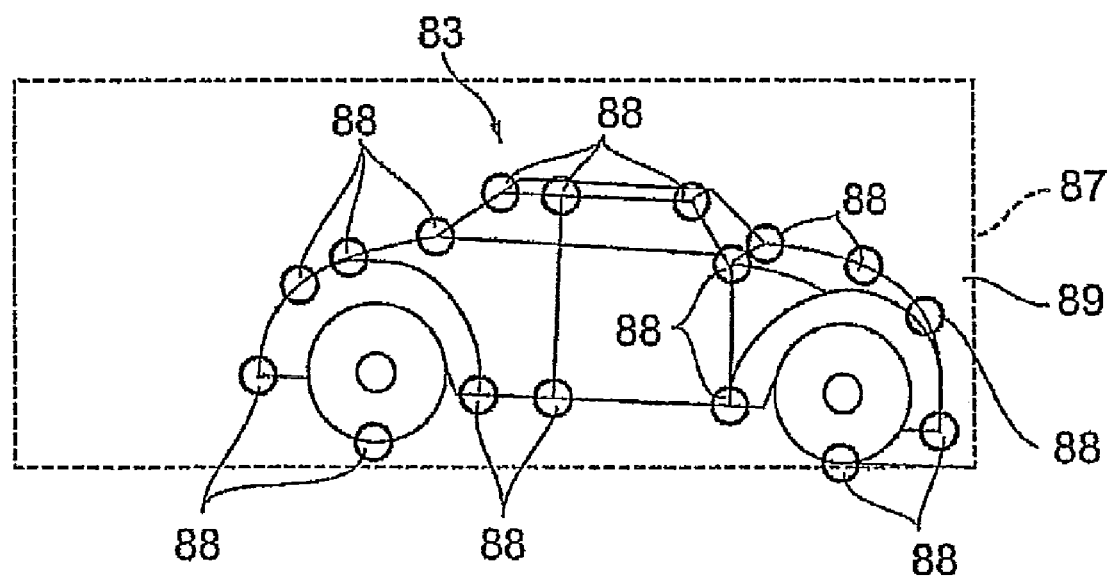

FIG. 18 illustrates an image 89 within the transformation target area 87 of the corresponding image 80.

Corresponding points 88, which correspond to the feature points 78 that have been decided with regard to the image 79 within the transformation target area 77, are decided with regard to the image 89 within the transformation target area 87.

Figure 19:
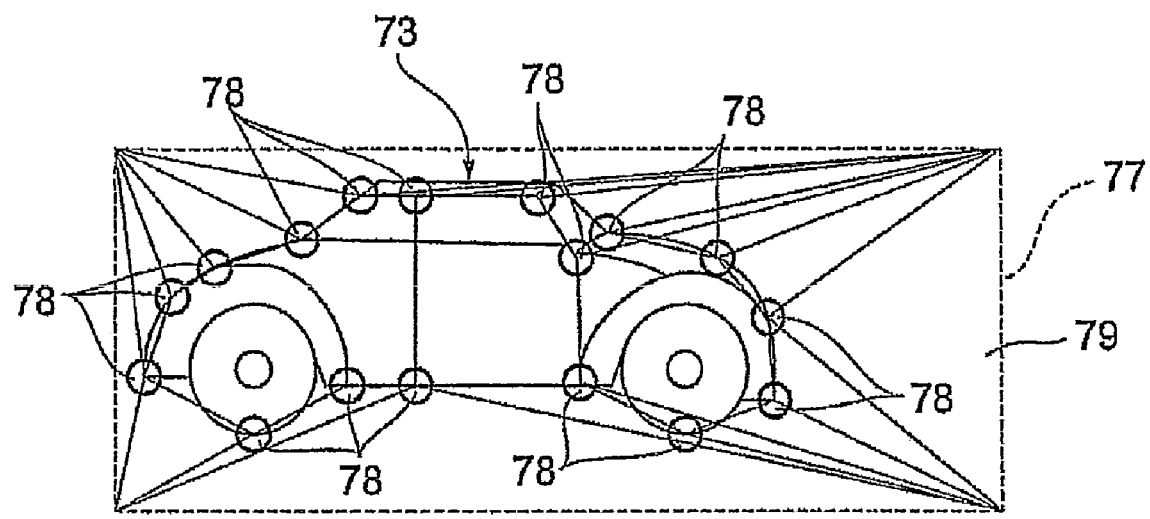

Next, triangulation (polygonization) is carried out, as illustrated in FIG. 19, utilizing the feature points 78 within the reference image 70 and the vertices of the transformation target area 77 (step 62 in FIG. 6).

Furthermore, intermediate points are decided. These are points present at positions that are intermediate the feature points 78 within the transformation target area 77 in the reference image 70 shown in FIG. 17 and their counterpart corresponding points 88 within the transformation target area 87 in the corresponding image 80 shown in FIG. 18 (step 63 in FIG. 6).

Next, with regard to the image 79 within the transformation target area 77 that has undergone triangulation, image transformation processing (triangular transformation processing) is executed, in accordance with the amount of movement of the moving subject image, for each triangle obtained by triangulation, in such a manner that the feature points 78 and the decided intermediate points will coincide (step 64 in FIG. 6).

Figure 20:
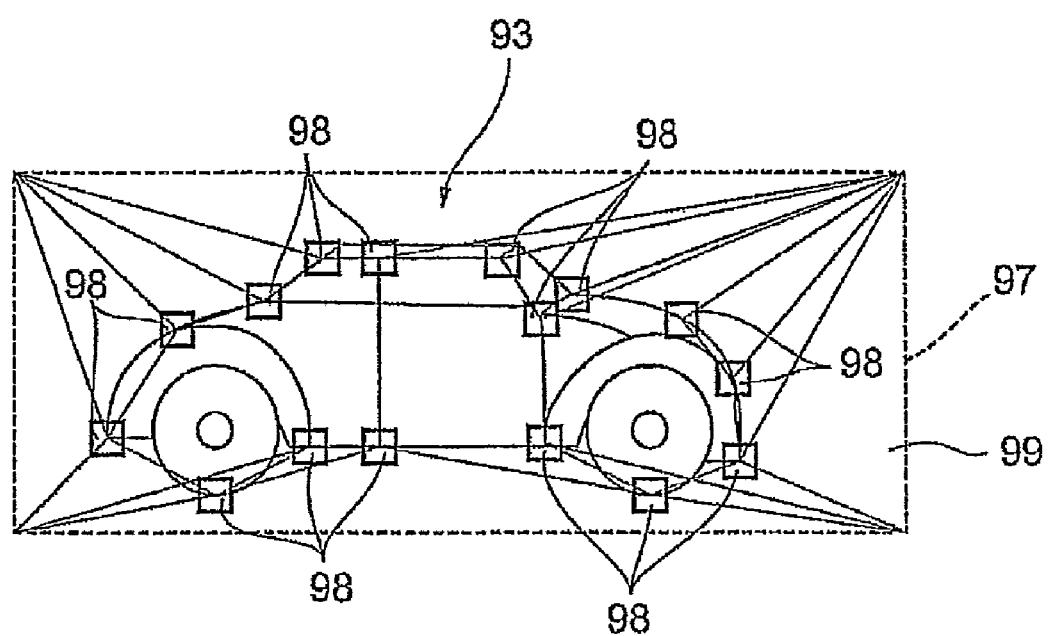

FIG. 20 illustrates the image (intermediate moving subject image) 93 of the automobile constituting the intermediate image obtained by the image transformation processing. By subjecting the image 79 within the transformation target area 77 that has undergone triangulation to image transformation processing, in accordance with the amount of movement of the moving subject image, for each triangle obtained by triangulation, in such a manner that the feature points 78 and the decided intermediate points coincide, as described above, the image 93 of the automobile constituting the intermediate image is obtained within an area 97 corresponding to the transformation target area 77.

Figure 21:
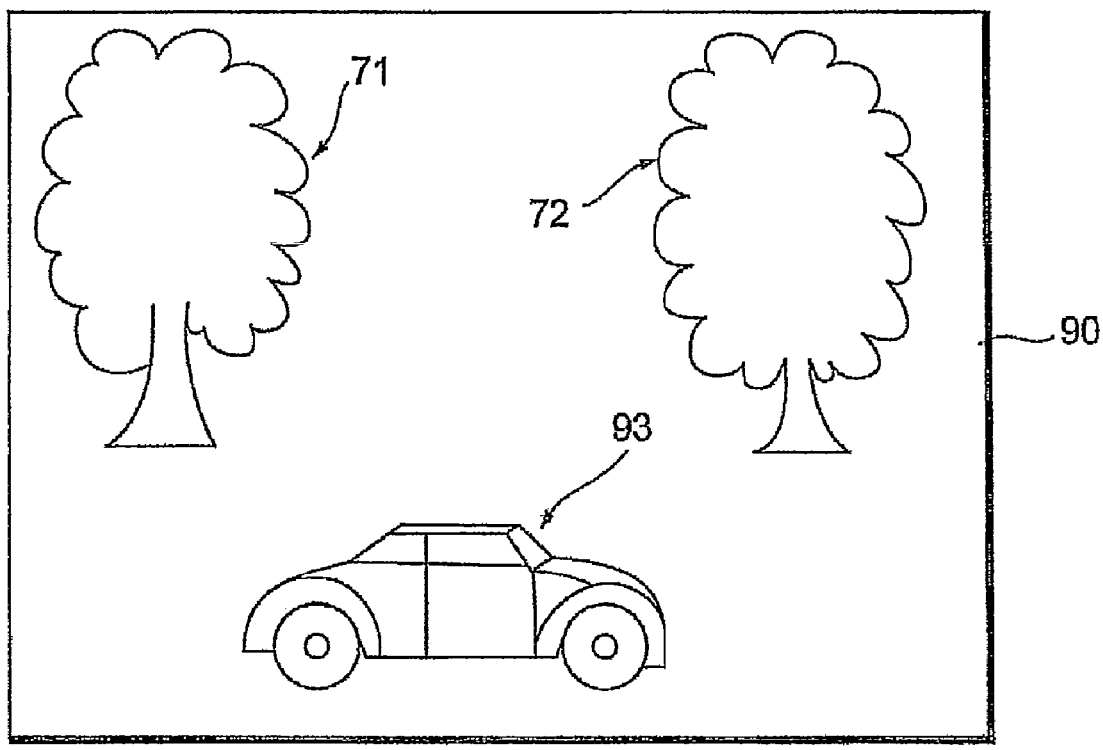
FIG. 21 illustrates an intermediate image.

By using an image 99, which has been generated as shown in FIG. 20, with regard to the interior of the area 97 and using the reference image 70 with regard to the exterior of the area 97, the intermediate image 90 is obtained, as illustrated in FIG. 21 (step 65 in FIG. 6). Specifically, with regard to the automobile, the intermediate image 90 is such that the automobile is positioned between reference image 70 and the corresponding image 80. With regard to the background, etc., of the automobile, the intermediate image 90 is such that the background is the same as in the reference image 70. If the reference image, intermediate image and corresponding image are viewed in the order mentioned, the motion of the moving vehicle will be smooth and shake will diminished with regard to the background, etc., which is not moving.

If a moving subject image does not exist ("NO" at step 57 in FIG. 6), or even if it has been determined that a moving subject image exists, a large number of corresponding points do not exist in the moving subject image (i.e., if it has been determined that a moving subject image exists owing to the effects of garbage) ("NO" at step 58 in FIG. 6), then an intermediate image is generated from the reference image 70 without executing the above-described image transformation processing (step 65 in FIG. 6). Naturally, it may be so arranged that the intermediate image is generated from the corresponding image once it has undergone an overall shake correction.

In the above-described embodiment, the moving subject image 93 of the intermediate image 90 is generated by transforming the image 79 within the transformation target area 77 of the reference image 70. However, it may be so arranged that the moving subject image 93 of the intermediate image 90 is generated by transforming the image 89 within the transformation target area 87 of the corresponding image 80.

In the above-described embodiment, an image that is intermediate two image frames is generated from the two image frames. However, by applying similar processing to a number of frames of a moving image, data representing a moving image having smooth motion can be generated.

Next, a method of calculating overall-image shake (the processing of step 55 in FIG. 5) between the reference image and corresponding image will be described.

In a case where image shake has occurred from feature points to corresponding points, as described above, the shake can be calculated utilizing an affine transformation and a projective transformation.

Equation (1) illustrates the affine transformation relation, and Equation (2) illustrates the projective transformation relation. The position of a corresponding point is indicated by (X,Y) in Equations (1), (2), and the position of a feature point by (x,y).

$$\begin{bmatrix} x \\ y \end{bmatrix} = \begin{bmatrix} a & b \\ c & d \end{bmatrix} \begin{bmatrix} X \\ Y \end{bmatrix} + \begin{bmatrix} s \\ t \end{bmatrix} \qquad \text{Eq. (1)}$$

$$x = \frac{a \cdot X + b \cdot Y + s}{p \cdot X + q \cdot Y + 1} \quad Y = \frac{c \cdot X + d \cdot Y + t}{p \cdot X + q \cdot Y + 1} \qquad \text{Eq. (2)}$$

If shake is calculated using the method of least squares, we proceed as follows:

A GM estimation based upon the method of least squares is Equation (3) below, where the matrix T represents feature points and is indicated by Equation (4). Further, the matrix A is an affine parameter vector and is indicated by Equation (5). The matrix F represents corresponding points and is indicated by Equation (6). Furthermore, the transposed matrix of the matrix F is Equation (7).

$$T \approx F \cdot A \qquad \text{Eq. (3)}$$

where $A = (F^T F)^{-1} \cdot F^T T$ $$T = \begin{pmatrix} X1 \\ Y1 \\ X2 \\ Y2 \\ \vdots \\ \vdots \end{pmatrix} \qquad \text{Eq. (4)}$$

$$A = \begin{pmatrix} a \\ b \\ c \\ d \\ s \\ t \end{pmatrix} \qquad \text{Eq. (5)}$$

$$F = \begin{pmatrix} x1 & y1 & 0 & 0 & 1 & 0 \\ 0 & 0 & x1 & y1 & 0 & 1 \\ x2 & y2 & 0 & 0 & 1 & 0 \\ 0 & 0 & x2 & y2 & 0 & 1 \\ \vdots & \vdots & \vdots & \vdots & \vdots & \vdots \\ \vdots & \vdots & \vdots & \vdots & \vdots & \vdots \end{pmatrix} \qquad \text{Eq. (6)}$$

$$FT = \begin{pmatrix} x1 & 0 & x2 & 0 & \vdots & \vdots \\ y1 & 0 & y2 & 0 & \vdots & \vdots \\ 0 & x1 & 0 & x2 & \vdots & \vdots \\ 0 & y1 & 0 & y2 & \vdots & \vdots \\ 1 & 0 & 1 & 0 & \vdots & \vdots \\ 0 & 1 & 0 & 1 & \vdots & \vdots \end{pmatrix} \qquad \text{Eq. (7)}$$

Finding the affine parameter vector results in Equation (8) below, and it can be defined as shown in Equations (9) and (10).

$$FT \cdot F = \begin{pmatrix} x1 & 0 & x2 & 0 & \vdots & \vdots \\ y1 & 0 & y2 & 0 & \vdots & \vdots \\ 0 & x1 & 0 & x2 & \vdots & \vdots \\ 0 & y1 & 0 & y2 & \vdots & \vdots \\ 1 & 0 & 1 & 0 & \vdots & \vdots \\ 0 & 1 & 0 & 1 & \vdots & \vdots \end{pmatrix} \begin{pmatrix} x1 & y1 & 0 & 0 & 1 & 0 \\ 0 & 0 & x1 & y1 & 0 & 1 \\ x2 & y2 & 0 & 0 & 1 & 0 \\ 0 & 0 & x2 & y2 & 0 & 1 \\ \vdots & \vdots & \vdots & \vdots & \vdots & \vdots \\ \vdots & \vdots & \vdots & \vdots & \vdots & \vdots \end{pmatrix} =$$

Eq. (8)

$$\begin{pmatrix} \sum_{k=1}^{n} xk^2 & \sum_{k=1}^{n} xkyk & 0 & 0 & \sum_{k=1}^{n} xk & 0 \\ \sum_{k=1}^{n} xkyk & \sum_{k=1}^{n} yk^2 & 0 & 0 & \sum_{k=1}^{n} yk & 0 \\ 0 & 0 & \sum_{k=1}^{n} xk^2 & \sum_{k=1}^{n} xkyk & 0 & \sum_{k=1}^{n} xk \\ 0 & 0 & \sum_{k=1}^{n} xkyk & \sum_{k=1}^{n} yk^2 & 0 & \sum_{k=1}^{n} yk \\ \sum_{k=1}^{n} xk & \sum_{k=1}^{n} yk & 0 & 0 & n & 0 \\ 0 & 0 & \sum_{k=1}^{n} xk & \sum_{k=1}^{n} yk & 0 & n \end{pmatrix}$$

$$F^T \cdot F = \begin{pmatrix} A & B & 0 & 0 & D & 0 \\ B & C & 0 & 0 & E & 0 \\ 0 & 0 & A & B & 0 & D \\ 0 & 0 & B & C & 0 & E \\ D & E & 0 & 0 & n & 0 \\ 0 & 0 & D & E & 0 & n \end{pmatrix}$$

Eq. (9)

$$A = \sum_{k=1}^{n} xk^2 \quad B = \sum_{k=1}^{n} xkyk \quad C = \sum_{k=1}^{n} yk^2$$
$$D = \sum_{k=1}^{n} xk \quad E = \sum_{k=1}^{n} yk$$

Eq. (10)

Further, the inverse matrix of Equation (9) is represented by Equation (11), where the relation of Equation (12) holds.

$$(F^T \cdot F)^{-1} = \frac{1}{\det} \times \begin{pmatrix} nC - E^2 & -nB + DE & 0 & 0 & BE - CD & 0 \\ -nB + DE & nA - D^2 & 0 & 0 & BD - AE & 0 \\ 0 & 0 & nC - E^2 & -nB + DE & 0 & BE - CD \\ 0 & 0 & -nB + DE & nA - D^2 & 0 & BD - AE \\ BE - CD & BD - AE & 0 & 0 & AC - B^2 & 0 \\ 0 & 0 & BE - CD & BD - AE & 0 & AC - B^2 \end{pmatrix}$$

Eq. (11)

$$\det = n(AC - B^2) + D(BE - CD) + E(BD - AE)$$

Eq. (12)

Equation (13) below holds from the Cauchy-Schwarz inequality, and the relation of Equation (14) holds.

$$AC - B^2 = \sum_{k=1}^{n} xk^2 \cdot \sum_{k=1}^{n} yk^2 - \left(\sum_{k=1}^{n} xkyk\right)^2 \geq 0$$

Eq. (13)

$$F^T \cdot T = \begin{pmatrix} x1 & 0 & x2 & 0 & \vdots & \vdots \\ y1 & 0 & y2 & 0 & \vdots & \vdots \\ 0 & x1 & 0 & x2 & \vdots & \vdots \\ 0 & y1 & 0 & y2 & \vdots & \vdots \\ 1 & 0 & 1 & 0 & \vdots & \vdots \\ 0 & 1 & 0 & 1 & \vdots & \vdots \end{pmatrix} \times \begin{pmatrix} X1 \\ Y1 \\ X2 \\ Y2 \\ \vdots \\ \vdots \end{pmatrix} = \begin{pmatrix} \sum_{k=1}^{n} xkXk \\ \sum_{k=1}^{n} ykXk \\ \sum_{k=1}^{n} xkYk \\ \sum_{k=1}^{n} ykYk \\ \sum_{k=1}^{n} Xk \\ \sum_{k=1}^{n} Yk \end{pmatrix}$$

Eq. (14)

Since affine parameters are calculated from Equation (15) below, shake from feature points to corresponding points is calculated.

$$A = (F^T F)^{-1} \cdot F^T T$$

Eq. (15)

Next, the image transformation processing (the processing of step 64 in FIG. 6) within the transformation target area mentioned above will be described.

If we assume that the vertices (x0, y0), (x1, y1) and (x2, y2) of a triangle generated as described above move to (X0, Y0), (X1, Y1) and (X2, Y2) (that is, if we assume movement from feature points to corresponding point within the transformation target area), then Equation (16) below will hold.

$$\begin{pmatrix} X0 \\ Y0 \\ X1 \\ Y1 \\ X2 \\ Y2 \end{pmatrix} = \begin{pmatrix} x0 & y0 & 0 & 0 & 1 & 0 \\ 0 & 0 & x0 & y0 & 0 & 1 \\ x1 & y1 & 0 & 0 & 1 & 0 \\ 0 & 0 & x1 & y1 & 0 & 1 \\ x2 & y2 & 0 & 0 & 1 & 0 \\ 0 & 0 & x2 & y2 & 0 & 1 \end{pmatrix} \begin{pmatrix} a \\ b \\ c \\ d \\ s \\ t \end{pmatrix}$$

Eq. (16)

Since the coefficients a, b, c, d, s, t are found from the inverse matrix of the transformation described above, we have Equations (17), (18) below, and Equation (19) is obtained, where the relation of Equation (20) holds.

$$\begin{pmatrix} X0 \\ Y0 \\ X1 \\ Y1 \\ X2 \\ Y2 \end{pmatrix} = C \cdot \begin{pmatrix} a \\ b \\ c \\ d \\ s \\ t \end{pmatrix} \qquad \text{Eq. (17)}$$

$$\begin{pmatrix} a \\ b \\ c \\ d \\ s \\ t \end{pmatrix} = C^{-1} \cdot \begin{pmatrix} X0 \\ Y0 \\ X1 \\ Y1 \\ X2 \\ Y2 \end{pmatrix} \qquad \text{Eq. (18)}$$

$$C^{-1} = \frac{1}{\det C} \begin{pmatrix} y1-y2 & 0 & y2-y0 & 0 & y0-y1 & 0 \\ x2-x1 & 0 & x0-x2 & 0 & x1-x0 & 0 \\ 0 & y1-y2 & 0 & y2-y0 & 0 & y0-y1 \\ 0 & x2-x1 & 0 & x0-x2 & 0 & x1-x0 \\ x1y2-x2y1 & 0 & x2y0-x0y2 & 0 & x0y1-x1y0 & 0 \\ 0 & x1y2-x2y1 & 0 & x2y0-x0y2 & 0 & x0y1-x1y0 \end{pmatrix} \qquad \text{Eq. (19)}$$

$$\det C = x0y1 + x2y0 + x1y2 - x0y2 - x2y1 - x1y0 \qquad \text{Eq. (20)}$$

If it is so arranged that (x0, y0) will always be at the origin, the Equation (21) below holds.

$$\begin{pmatrix} X0 \\ Y0 \\ X1 \\ Y1 \\ X2 \\ Y2 \end{pmatrix} = \begin{pmatrix} 0 & 0 & 0 & 0 & 1 & 0 \\ 0 & 0 & 0 & 0 & 0 & 1 \\ x1 & y1 & 0 & 0 & 1 & 0 \\ 0 & 0 & x1 & y1 & 0 & 1 \\ x2 & y2 & 0 & 0 & 1 & 0 \\ 0 & 0 & x2 & y2 & 0 & 1 \end{pmatrix} \begin{pmatrix} a \\ b \\ c \\ d \\ s \\ t \end{pmatrix} \qquad \text{Eq. (21)}$$

Since (x0, y0) is only the amount of shift, it moves to (s,t). Accordingly, the inverse matrix of Equation (19) becomes Equation (22) below, where the relation of Equation (23) holds.

$$C^{-1} = \qquad \text{Eq. (22)}$$
$$\frac{1}{\det C} \begin{pmatrix} y1-y2 & 0 & y2 & 0 & -y1 & 0 \\ x2-x1 & 0 & -x2 & 0 & x1 & 0 \\ 0 & y1-y2 & 0 & y2 & 0 & -y1 \\ 0 & x2-x1 & 0 & -x2 & 0 & x1 \\ x1y2-x2y1 & 0 & 0 & 0 & 0 & 0 \\ 0 & x1y2-x2y1 & 0 & 0 & 0 & 0 \end{pmatrix}$$

$$\det C = x1y2 - x2y1 \qquad \text{Eq. (23)}$$

The coefficients a, b, c, d, s, t are as indicated by Equations (24) to (29) below.

$$a = \frac{1}{x1y2 - x2y1}((y1-y2)X0 + y2X1 - y1X2) \qquad \text{Eq. (24)}$$

$$b = \frac{1}{x1y2 - x2y1}((x2-x1)X0 - x2X1 + x1X2) \qquad \text{Eq. (25)}$$

$$c = \frac{1}{x1y2 - x2y1}((y1-y2)Y0 + y2Y1 - y1Y2) \qquad \text{Eq. (26)}$$

$$d = \frac{1}{x1y2 - x2y1}((x2-x1)Y0 - x2Y1 + x1Y2) \qquad \text{Eq. (27)}$$

$$s = X0 \qquad \text{Eq. (28)}$$

$$t = Y0 \qquad \text{Eq. (29)}$$

Thus, it is possible to move from feature points to corresponding points (to execute an image transformation) within the transformation target area described above.

As many apparently widely different embodiments of the present invention can be made without departing from the spirit and scope thereof, it is to be understood that the invention is not limited to the specific embodiments thereof except as defined in the appended claims.

What is claimed is:

1. An intermediate image generating apparatus comprising:
    a first feature point deciding device for deciding a plurality of feature points, which indicate the shape features of a subject, from within a first image, wherein the first image and a second image have been obtained by continuous shooting;
    a first corresponding point deciding device for deciding corresponding points, which correspond to the feature points decided by said first feature point deciding device, from within the second image;
    a moving subject image detecting device for detecting moving subject images in respective ones of the first and second images, the moving subject images being subject images contained in the first and second images and representing an object moving from capture of the first image to capture of the second image;
    a transformation target area setting device for setting transformation target areas in respective ones of the first and second images, the transformation target areas enclosing both the positions of feature points, which are present in the moving subject image detected by said moving subject image detecting device, from among the feature points decided by said first feature point deciding device, and the positions of corresponding points, which are present in the moving subject image detected by said moving subject image detecting device, from among the corresponding points decided by said first corresponding point deciding device;

a second feature point deciding device for deciding a plurality of feature points of an image within the transformation target area of the first image set by said transformation target area setting device;

a second corresponding point deciding device for deciding corresponding points, which correspond to the feature points decided by said second feature point deciding device, in an image within the transformation target area of the second image set by said transformation target area setting device;

an intermediate moving subject image generating device for generating an intermediate moving subject image by transforming the image within the transformation target area of the first image or second image in such a manner that this image is positioned at intermediate points present at positions that are intermediate the feature points decided by said second feature point deciding device and the corresponding points decided by said second corresponding point deciding device; and an intermediate image generating device for generating an image that is intermediate the first and second images using the intermediate moving image generated by said intermediate moving image generating device.

2. The apparatus according to claim 1, further comprising an external-area image portion transforming device for transforming the second image in such a manner that the corresponding points decided by said first corresponding point deciding device will coincide with the feature points decided by said first feature point deciding device with regard to an image portion that is external to the transformation target area;

wherein with regard to the interior of the transformation target area, said intermediate image generating device generates the image intermediate the first and second images using the intermediate moving subject image generated by said intermediate moving subject image generating device, and with regard to the image portion exterior to the transformation target area, said intermediate image generating device generates the image intermediate the first and second images using the first image or the image portion, external to the transformation target area, generated by said external-area image portion transforming device.

3. The apparatus according to claim 1, wherein said moving subject image detecting device detects the moving subject images based upon motion that is different from motion of the total of the plurality of feature points decided by said first feature point deciding device and corresponding points decided by said first corresponding point deciding device.

4. The apparatus according to claim 3, wherein said moving subject image detecting device detects the moving subject images based upon motion that is different from motion of the total of the plurality of feature points decided by said first feature point deciding device and corresponding points decided by said first corresponding point deciding device, with the proviso that the number of corresponding points that undergo this different motion is greater than a prescribed number.

5. A method of controlling operation of an intermediate image generation apparatus, comprising the steps of:

deciding a plurality of feature points, which indicate the shape features of a subject, from within a first image, wherein the first image and a second image have been obtained by continuous shooting;

deciding corresponding points, which correspond to the feature points that have been decided, from within the second image;

detecting moving subject images in respective ones of the first and second images, the moving subject images being subject images contained in the first and second images and representing an object moving from capture of the first image to capture of the second image;

setting transformation target areas in respective ones of the first and second images, the transformation target areas enclosing both the positions of feature points, which are present in the moving subject image that has been detected, from among the feature points that have been decided, and the positions of corresponding points, which are present in the moving subject image that has been detected, from among the corresponding points that have been decided;

deciding a plurality of feature points of an image within the set transformation target area of the first image;

deciding corresponding points, which correspond to the feature points that have been decided, in an image within the set transformation target area of the second image;

generating an intermediate moving subject image by transforming the image within the transformation target area of the first image or second image in such a manner that this image is positioned at intermediate points present at positions that are intermediate the feature points that have been decided and the corresponding points that have been decided; and generating an image that is intermediate the first and second images using the intermediate moving image that has been generated.

6. A non-transitory recording medium storing a computer-readable program for controlling a computer of an intermediate image generating apparatus so as to:

decide a plurality of first feature points, which indicate the shape features of a subject, from within a first image, wherein the first image and a second image have been obtained by continuous shooting;

decide first corresponding points, which correspond to the feature points that have been decided, from within the second image;

detect moving subject images in respective ones of the first and second images, the moving subject images being subject images contained in the first and second images and representing an object moving from capture of the first image to capture of the second image;

set transformation target areas in respective ones of the first and second images, the transformation target areas enclosing both the positions of first feature points, which are present in the moving subject image that has been detected, from among the first feature points that have been decided, and the positions of first corresponding points, which are present in the moving subject image that has been detected, from among the first corresponding points that have been decided;

decide a plurality of second feature points of an image within the set transformation target area of the first image;

deciding second corresponding points, which correspond to the second feature points that have been decided, in an image within the set transformation target area of the second image;

generating an intermediate moving subject image by transforming the image within the transformation target area of the first image or second image in such a manner that this image is positioned at intermediate points present at positions that are intermediate the second feature points and the second corresponding points that have been decided; and generate an image that is intermediate the first and second images using the intermediate moving image that has been generated.

* * * * *